C. CUNNINGHAM.
Carbureter.
No. 12,535. Patented Mar. 13, 1855.
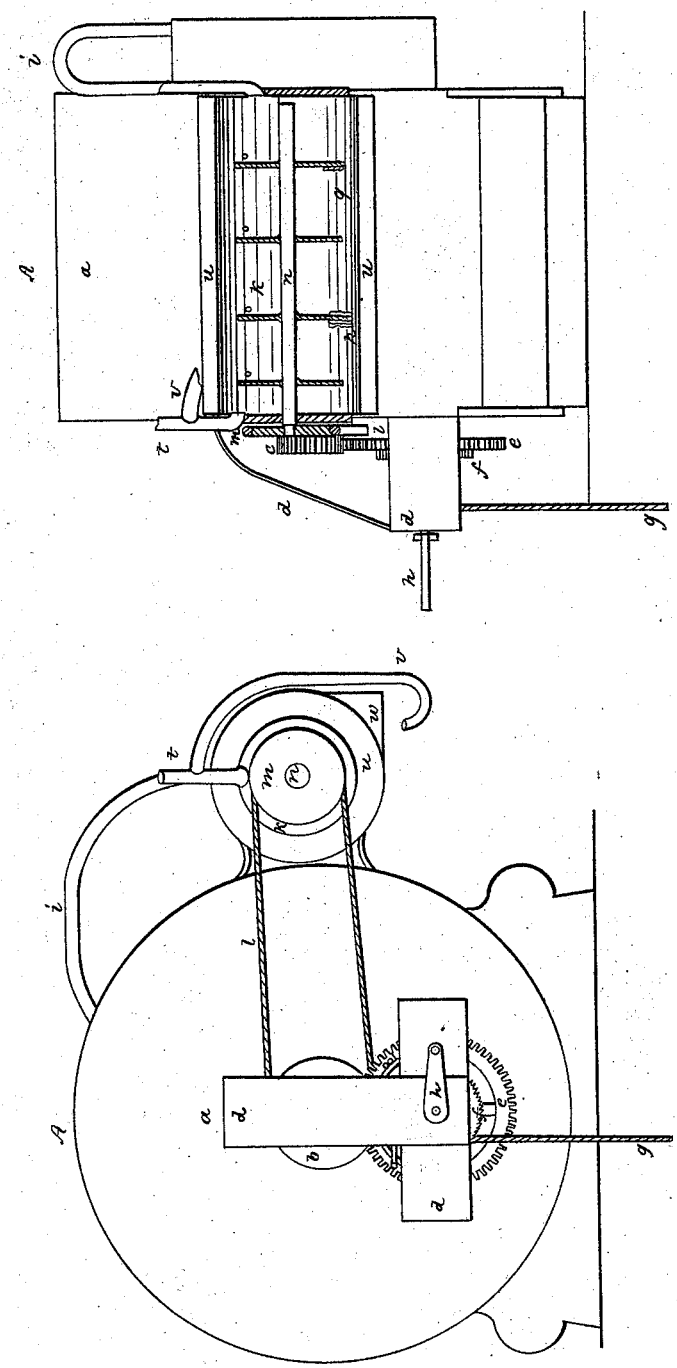
Witnesses:
Inventor:
Charles Cunningham

UNITED STATES PATENT OFFICE.

CHARLES CUNINGHAM, OF NASHUA, NEW HAMPSHIRE, ASSIGNOR TO JOHN C. PEDRICK, OF NEW YORK, N. Y.

BENZOLE VAPOR APPARATUS.

Specification of Letters Patent No. 12,535, dated March 13, 1855.

*To all whom it may concern:*

Be it known that I, CHARLES CUNINGHAM, of Nashua, in the county of Hillsboro, State of New Hampshire, have invented a new and useful machine or apparatus for driving a current of air through a reservoir, constructed as hereinafter described, containing benzole or any other hydrocarbon, or the admixture of any hydrocarbon with any alcoholic liquid and water, for the purpose of generating an illuminating-gas or vapor therefrom; and I do hereby declare that the following is a full, clear, and exact description of the construction and operation of the same, reference being had to the annexed drawings, making a part of this specification, in which—

Figure 1 is an end view of the apparatus, and Fig. 2, a longitudinal section of the reservoir, showing its interior construction.

The nature of my invention consists in the use of a common gas meter wheel or its equivalent, revolving in water or other liquid, or of any other equivalent apparatus for forcing a current of air through a reservoir, containing either of the aforesaid hydrocarbons or admixtures, in the manner hereinafter described, for the purpose of generating an illuminating gas or vapor, and in compensating for the loss of temperature caused by the evaporation of either of the aforesaid hydrocarbons or admixtures, and raising and sustaining their temperature, when necessary, in the manner as hereinafter specified.

To enable others skilled in the art, to make and use my invention, I will now proceed to describe its construction and operation, referring to the accompanying drawings and the letters of reference thereon.

I take a common meter $a$, such as is used for measuring coal-gas, divested or not of the measuring apparatus, and upon one end of the drum-shaft thereof, I fasten a pulley $b$, and pinion $c$. I next attach to the same end of the meter a frame $d$, holding a gear wheel $e$, and a ratchet $f$, playing upon an ordinary shaft, to which is attached a cord $g$, with a sufficient weight to propel the meter wheel by means of this gearing or other analogous arrangement. This shaft may, however, be driven by a spring or springs fastened to it. To the end of the gear shaft is attached a crank $h$, by which the weight is wound up like a common clock. The air is admitted into one of the openings A of the meter case, and conducted from or forced out of the other end thereof, by a pipe $i$ into the reservoir $k$, which is either secured to the meter case or placed at a convenient distance therefrom. The top of the outside meter case may be left off, in which event, the air is admitted at one end of the meter-wheel, and forced out through an inverted syphon or its equivalent at the other. Upon the pulley $b$ of the meter, plays a cord, belt or endless chain $l$, which again plays upon a pulley $m$, attached to the shaft $n$, which revolves in packing boxes, in the usual way, within the cylindrical reservoir $k$, but the shaft $n$ may be revolved by appropriate gearing connection with the drum-shaft of the meter wheel, or by any other analogous device.

Upon the shaft $n$, which may be hollow and perforated with small holes, throughout its length, for admitting the current of air from the blast apparatus, and allowing it to pass through the said holes into the reservoir $k$, or which may be solid, as shown in the model, are fastened at suitable distances, say an inch, more or less, disks of perforated tin or other substance, or of wire gauze $o$, of sixteen meshes more or less to the inch, and of such diameter as to have a space of a quarter of an inch or more, between their peripheries and the interior surface of the reservoir $k$, for the purpose of carrying portions of sponge $p$, or lamp-wicking $q$, or other porous or absorbent substances, attached to the peripheries of the said disks, or stretched lengthwise from disk to disk, or where the substance admits of it, wound around wires or cords passing through the holes or meshes of the disks, or around slats of wood, extended from disk to disk and secured thereto, or fastened to arms substituted for said disks. The porous or absorbent substances used as above, or any other material suitable for carrying up liquids, when dipped therein, by adhesion thereto, such as hair, bristles, wire-gauze, perforated, smooth or corrugated plates of tin, zinc or other metal, may be attached and secured directly to the hollow shaft above mentioned, or to the shaft $n$, in any convenient manner. The object of the sponge, lamp-wicking and wire-gauze or their equivalents, is to take up and hold in suspension a portion of the contents of the reservoir $k$, through which they are revolved or moved, in order that the current of air driven into the reservoir, as above described, or in any other analogous manner, and coming in contact with or passing near the innumerable fluid surfaces thus exposed, shall evolve or generate, to the best advantage, the illuminating gas or vapor therefrom, which passes out to the burner through the pipe $t$. The disseminator $n\ o$, of the reservoir $k$, may be entirely dispensed with, and the current of air from the blast apparatus may be driven directly into the reservoir $k$, so as to bubble up through and pass over the contents thereof, and thus create the gas or vapor to be burned.

The cylindrical reservoir $k$ is inclosed in an outside vessel $u$, of any convenient shape, of such size as to allow the reservoir $k$, to be either wholly or in part surrounded by a body of water of any desirable bulk, for the purpose of sustaining the temperature of the contents of the reservoir or rather of compensating for the loss of temperature in the contents thereof, by their evaporation, while the gas or vapor is evolved, but when the apparatus is exposed to undue cold, the water surrounding the reservoir, either wholly or in part, may be heated before being poured into the vessel $u$, or it may be warmed or heated by the application of the swinging burner $v$, connected with the outlet pipe $t$, or immediately with the reservoir $k$, or in any other convenient manner, so as to bring the flame directly under the heater or projection $w$, which is attached to and connected with the outside vessel $u$, and is therefore filled with water, or by a piece of heated free-stone or other material capable of retaining caloric a long time, when heated, which may be secured to the under side of the heater or projection $w$. But the water or other liquid in the meter $a$ or outside vessel $u$, or the contents of the reservoir $k$, may be warmed or heated by a current of warm or hot air being thrown into them, through a pipe, by exposing one end thereof open, over the flame of one of the burners of the apparatus, or by heating the body of the pipe itself, in the same way, or in any other analogous manner. The water vessel $u$, however, may be dispensed with, and the temperature of the contents of the reservoir $k$, or its equivalent, may be raised and sustained, when required, by either of the direct applications of heat above described, or in any other analogous way. Again, the reservoir $k$ may be also dispensed with, by attaching in the same or a similar manner, to the floats or shaft of the meter wheel, or to arms inserted in the shaft thereof, any of the substances described as above and used in the disseminator $n\ o$, and substituting for the water or other liquid of the meter, either of the hydro-carbons or admixtures aforesaid, for the purpose of generating illuminating gas or vapor as aforesaid, by the revolution of the blast-wheel or meter wheel in the manner aforesaid, or by any other analogous device, in which case, the current of air is admitted into one end of the meter, and the gas or vapor generated by it, forced out of the other end, through an appropriate outlet leading to the burner. There are appropriate apertures in the top of the reservoir $k$, and outside vessel $u$, for pouring in the contents destined for each, and there may be provided at convenient points near the base of each of these vessels, cocks for drawing off their contents at any time.

Now, what I claim as my invention, and desire to secure by Letters Patent, in the name of my assignee, the said John C. Pedrich, is:—

1. The combination of the heater $w$, and the swinging gas burner $v$, or of the induction air pipe A and any one of the burners of the apparatus, with the water vessel $u$, the reservoir $k$, or the meter $a$, substantially as herein described, for the purpose of keeping the contents of the vessel containing the benzole or light producing liquid, at a given temperature.

2. The combination of the reservoir $k$ and the rotary disseminator $n\ o$, with an ordinary rotary meter wheel, substantially as herein described, for forcing air through the hollow shaft or its equivalent into the reservoir $k$, for the purpose of vaporizing the benzole of the latter vessel.

3. The particular mode of making the rotary disseminator $n\ o$, substantially as herein described, and for the purposes herein specified, not meaning to claim the use of the hollow shaft for evaporating saccharine fluids.

4. The application and use of the meter wheel, with its case and contents, as an air blast-apparatus, operated by weights or otherwise, not meaning to claim the method of using the meter for measuring gas.

CHARLES CUNINGHAM.

Witnesses:
Acum F. Stevens,
Geo. Y. Sawyer.